Nov. 8, 1955  F. N. SPRAGUE  2,723,129
MEANS FOR RAISING TRACTOR DRAWN IMPLEMENTS
Filed July 21, 1950  2 Sheets-Sheet 1

Inventor
FRANK N. SPRAGUE

By WHITEHEAD & VOGL
PER Carl Whitehead
Attorneys

Nov. 8, 1955   F. N. SPRAGUE   2,723,129
MEANS FOR RAISING TRACTOR DRAWN IMPLEMENTS
Filed July 21, 1950   2 Sheets-Sheet 2
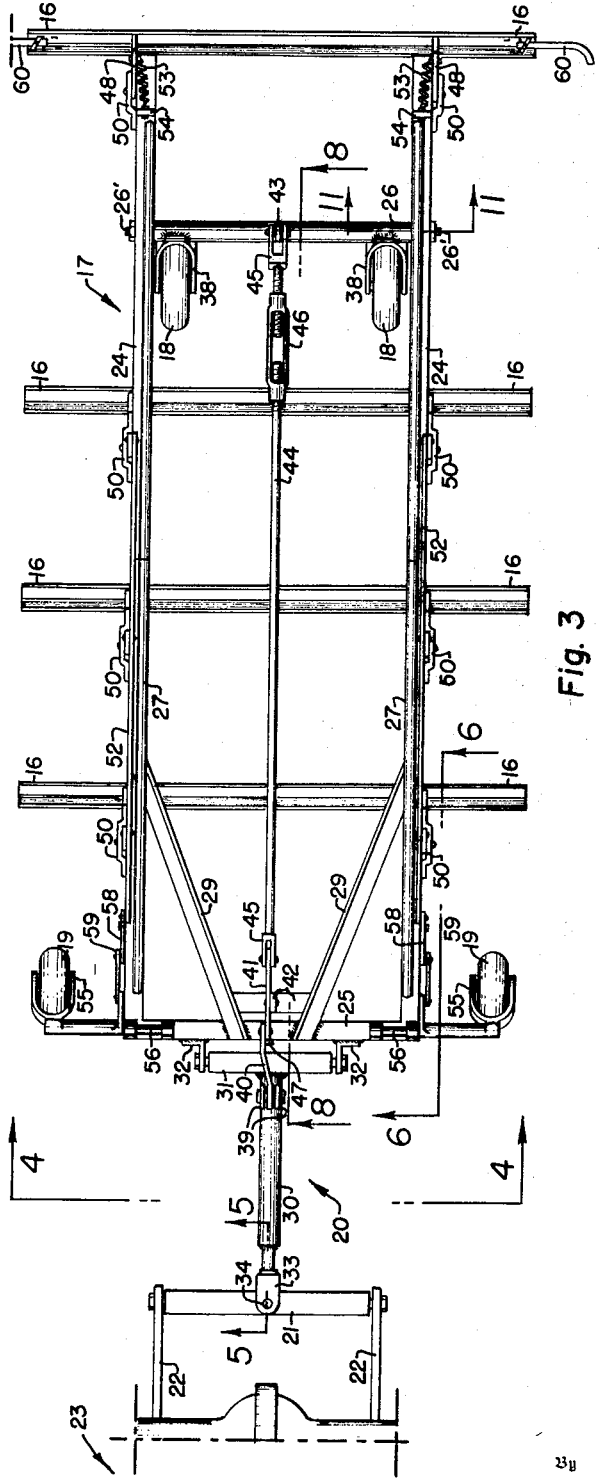
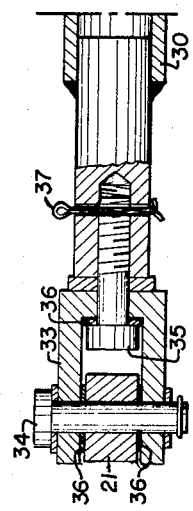
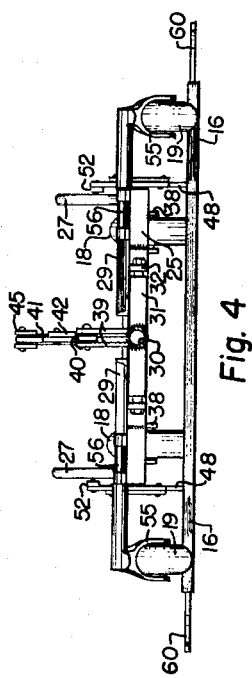
Inventor
FRANK N. SPRAGUE
By WHITEHEAD & VOGL
PER Carl E Whitehead
Attorneys

United States Patent Office 2,723,129
Patented Nov. 8, 1955

2,723,129

MEANS FOR RAISING TRACTOR DRAWN IMPLEMENTS

Frank N. Sprague, Payette, Idaho

Application July 21, 1950, Serial No. 175,131

1 Claim. (Cl. 280—44)

This invention relates to earth-moving devices of the class particularly adapted for land-leveling operations, and has as an object to provide a new and improved land-leveling apparatus adapted for use in fields wherein the earth is of a friable nature.

Another object of this invention is to provide a land-leveling apparatus which is especially adapted to condition a field subsequent to plowing wherein it is desirable to have the ground perfectly level and smooth.

Another object of this invention is to provide a new and improved wheel-mounted land-leveling apparatus having a plurality of leveling elements which are associated with the wheels of the apparatus in such a manner as to hold the elements in their altitudinal operative position as the apparatus moves over uneven earth and the wheels rise over ridges or drop into depressions.

Yet another object of this invention is to provide a wheel-mounted land-leveling apparatus which may be attached to the lift bars of a tractor and held in operative position with the tractor lift bars lowered, but adapted to be lifted off the ground with all leveling elements above the ground whenever the tractor lift bars are raised, with the unit then resting on its rear wheels and adapted to be easily transported.

Yet another object of this invention is to provide, in a land-leveling apparatus adapted to be attached to the lift bars of the tractor, a connective link which is universally free to yield to all movement differentials between the tractor and the land leveler as the tractor drags the leveler over uneven ground.

A further object of the invention is to provide a land-leveling apparatus which is more efficient, but lighter, than devices commonly used for such purpose.

Yet a further object of this invention is to provide a land-leveling device which is extremely simple in construction, and with its elements arranged to provide a sturdy light-weight unit, economical in cost, and adapted for heavy duty service over a long period of actual use.

With these and other objects in view, all of which more fully hereinafter appear, my invention comprises certain novel constructions, combinations and arrangements of parts as hereinafter described and as defined in the appended claims and illustrated, in preferred embodiment, in the accompanying drawing in which:

Figure 3 is a plan of the apparatus.

Figure 4 is a front elevation as viewed from the indicated line 4—4 at Fig. 3.

Figure 5 is a fragmentary section, on an enlarged scale, of the coupler as taken on the indicated line 5—5 at Fig. 3.

Figure 1:
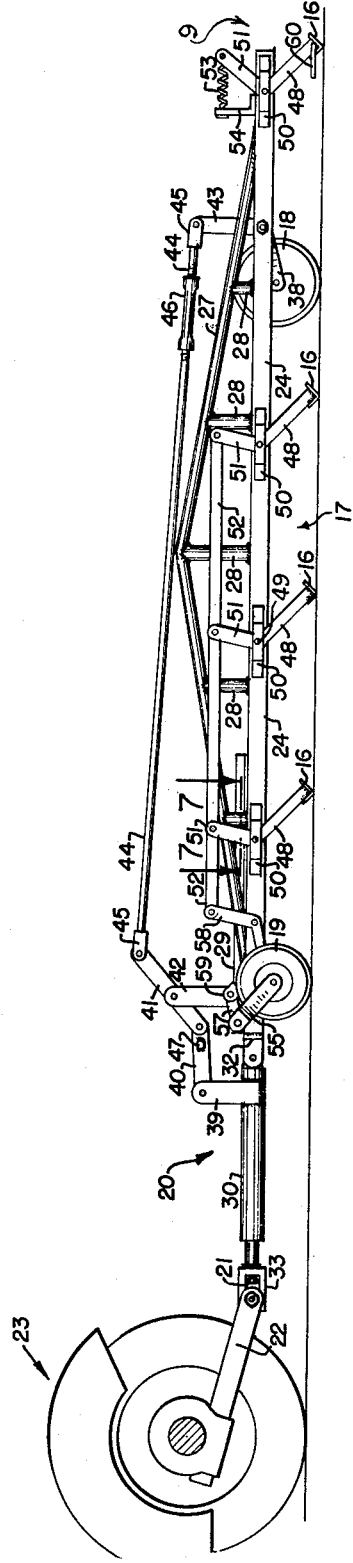
Figure 1 is a side elevation of the land-leveling apparatus as connected to a tractor and positioned as for operation.

A multitude of instances arise wherein it is expedient to provide field leveling operations of a character which require a final grading and preparing of a field, such as after an earth-moving operation, or to fill in small washes or rows, or to break up clods left by deep plowing, or to condition a field to a uniformity and flatness not attainable by conventional harrowing operations. A common apparatus for this purpose is a float, adapted to be pulled by a tractor or any other conventional means. A conventionally-built float will comprise one or a plurality of dragbars positioned transversely to the direction of movement, which by their weight break down small high spots or hummocks over which they pass and then slide the displaced earth transversely along the dragbars toward lower spots. These conventional floats are heavy and still unsatisfactorily limited in their earth-moving capacity. Excessive weight of a given float will cause the float to dig too deeply into the earth and dig a trench instead of performing a leveling operation, but a float not excessively weighted cannot effectively cut down a ridge of earth which lies transverse to its direction of movement, as the dragbars of such float will ride over such ridge. A conventional float is necessarily a clumsy heavy piece of equipment which is not only difficult to drag in the fields, but is also not adapted for transportation to and from the field.

While the present invention is a leveling apparatus of the same general class as leveling bars or floats, its principle of operation is a radical departure from that of such conventional apparatus. It comprises, in essence, a wheel mounted float having comparatively narrow, light-weight dragbars suspended from a frame and coactively associated with the front wheels of the apparatus as hereinafter described. In operation, there is small resistance to the drag bars wherever the earth surface is comparatively level, but considerable force is exerted whenever a drag bar encounters a hillock or ridge, whereby the drag bar will tend to cut through and remove the obstruction rather than ride over it. The coaction of the front wheels and drag bars permits automatic adjustment of the position of the drag bars with respect to the frame whenever a wheel drops into a depression or passes over a hump whereby the actual level of the drag bars is not appreciably changed by such dropping or rising of the wheels. The advantages of such functioning in land-leveling apparatus are obvious, and these and other desirable features will become apparent in the following detailed description of a preferred embodiment of my invention.

In this embodiment, a plurality of drag bars 16 depend from a wheel-mounted frame 17, as hereinafter described, said frame having a pair of rear wheels 18 and a pair of front wheels 19 to provide a stable four-point support of the apparatus. A tongue 20 is pivotally attached to the frame, and extends forwardly of the apparatus and is adapted for connection to a crossbar 21 mounted between the lift bars 22 of a conventional tractor 23, it being anticipated that the lift bars 22 will be advantageously used to raise the drag bars and front wheels of the leveling apparatus for transportation as hereinafter described.

The leveling apparatus itself is a rectangularly shaped unit having transverse elements thereof perpendicular to the longitudinal elements and having corresponding longitudinal elements evenly spaced from a central longitudinal axis to provide a symmetrical balanced unit. The frame 17 of this apparatus comprises two longitudinal horizontally disposed side angle bars 24, each having one leg upstanding and the other leg inwardly turned. These side bars 24 are interconnected at their front ends by a front angle bar 25, welded thereto, and interconnected near their rear ends by a transverse shaft 26 secured as by bolts 26' to the upstanding legs of said side bars. These side bars 24 are suitably reinforced by trussing with rods 27, welded thereto, to form the upper cord truss members, and connected to the bars 24 by a plurality of evenly spaced uprights 28. To hold the frame 17 square, diagonal braces 29 are welded to the side bars 24 and to the front bar 25. It follows that these braces, in conjunction with the trussed construction of the side bars, provides a rigid frame except that it is not adapted to resist a warping action about the longitudinal axis, for it is contemplated that neither the stiffness of the front bar 25 nor the tightness of the connection of the shaft 26 to the side bars 24 is sufficient to prevent such longitudinal warping as might occur with one corner of the frame lowered slightly. As hereinafter pointed out, such warping action of the frame is desirable and necessary for the proper functioning of the apparatus.

The tongue 20 comprises a T-shaped unit having its central leg 30 extending forwardly of the frame 17 and its transverse cross leg 31 adjacent the front bar 25 and pivotally attached thereto by clip angles 32 at each end which forwardly outstand the front bar 25. It follows that the leg 30 may be rotated upwardly from its operative position in alignment with the apparatus longitudinal axis, as by raising the tractor lift bars 22. The purpose of this upward rotative movement is to lower the rear wheels 18 by means hereafter described, and thereby raise the apparatus.

The connection between the tongue 20 and the tractor 23 is of the nature of a universal joint, the cross bar 21 being pivotally connected to the lift bars 22 to provide rotative movements about a horizontal axis transverse to the longitudinal tractor axis. The end of the tongue 20 carries a clevis 33 connected to the cross bar 21 by a pin 34 to provide rotative movements about a normally vertical axis, the clevis 33 being abutted against the end of the tongue 20 and held thereto by a headed bolt 35 to provide rotative movements about the longitudinal axis of the tongue. It follows that dipping movements, as in a change of grade between the tractor and the leveling apparatus rotate the cross bar 21 at its attachment to lift bars 22, while turning movements, as on a horizontal curve, rotate the clevis 33 about the pin 34, and longitudinal twisting as by sidewise swaying rotates the clevis 33 about the bolt 35. Suitable bearing washers 36 are provided at the pin 34 and bolt 35 head. The bolt 35 is held in the tongue in any conventional manner, as by being threaded therein and locked in position by a cotter key 37.

The rear wheels 18 are preferably a balloon tire type to provide a large resilient bearing surface to hold the weight of the unit without impressing their marks too deeply into the earth. Each wheel is mounted in a yoke 38, fixedly attached to the shaft 26 adjacent a side bar 24 whereby rotation of the shaft 26 simultaneously alters the altitudinal position of the wheels 18 with respect to the frame 17. In operation of the apparatus it is contemplated that the yokes 38 approximate a horizontal position forwardly of the shaft 26, and from such position the wheels may be rotated downwardly with respect to the frame to actually lift the rear portion of the frame 17 and the drag bars 16 attached thereto.

Rotation of the shaft 26 is accomplished through the lifting of the tongue 20 as hereinbefore stated through the following structure. A strut 39 fixedly upstands the tongue 20 near the pivotal point and is thus adapted to move rearwardly as the tongue 20 is rotated upwardly. A pivotal link 40 connects the outer end of this strut 39 with the end of a rocker arm 41 which is mounted upon a standard 42 rigidly upstanding between the braces 29 at the forward end of the frame, the point of connection with the rocker arm 41 being downward and forwardly of the standard 42 with the tongue 20 in its lowered position, whereby rearward movement of the link 40, through raising of the tongue 20, causes a forward movement of the upwardly disposed opposite end of the rocker arm 41. This upward end of the rocker arm 41 is connected to the outer end of a strut 43 centrally and substantially upstandingly attached to the shaft 26 through a pull-rod 44. This rod 44 is provided with suitable clevises 45 at each end for pivotal connection with the rocker arm 41 and strut 43, and is further provided with a turnbuckle 46 for adjusting the length of rod 44 and thereby adjusting the position of the wheels 18 with respect to the alignment of the tongue 20.

Figure 2:
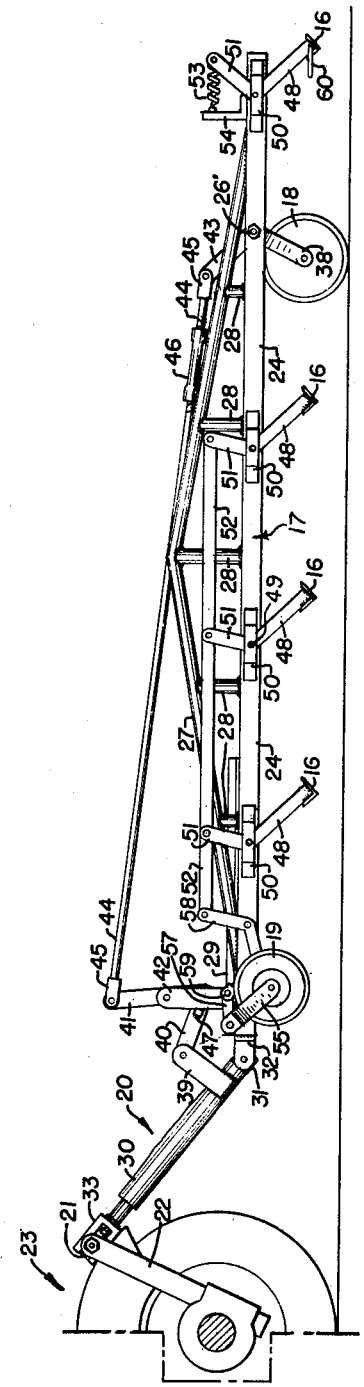
Figure 2 is a side elevation similar to Fig. 1, but illustrating the forward part of the land-leveling apparatus lifted from the earth and the apparatus positioned as for transportation.

The normal operative position of the apparatus is assumed with the tongue 20 lowered to approximate alignment with the apparatus longitudinal axis. Therefore, by raising the tractor lift bars 22 and rotating the tongue 20 upwardly, the frame 17 will be lifted above the rear wheels. This motion is extended through a definite portion of the raising movement of the lift bars 22, and a stop 47 outstanding from the side of the link 40 contacts the edge of the standard 42 to limit further movement of the linkage between the tongue 20 and the wheels 18 as the lift bars complete said portion of raising movement. Further raising of the lift bars 22 lifts the front portion of the leveling apparatus, and, in final position, the frame and drag bars 16 depending therefrom are well above the ground with the apparatus resting upon its rear wheels 18 and thereby positioned for easy transportation as clearly illustrated at Fig. 2.

A plurality of drag bars 16 may be positioned below the frame 17 in any suitable spacing arrrangement, such as that illustrated in the drawing, and carried transversely of the side bars 24, at the ends of work arms 48 of bell crank levers, later described, which arms pivotally depend from each side bar. These drag bars may be of any desirable shape, angle bars being used in the hereindescribed embodiment, with one leg of the angles positioned across the bottoms of the arms 48 and with the other leg at the arm leading face, whereby the point of the angles will be downward when the arms 48 are sloped at about 45 degrees rearwardly from their pivotal connections with the side bars 24, as illustrated in the drawings. It is anticipated that the arms 48 will be thus sloped, for the drag bars will then tend to lift more easily over immovable obstructions and, more important, this positioning provides altitudinal movement of the drag bars through slight rotation of the arms 48 on their pivots, such movements being a basic feature of the operation of the apparatus as hereinafter described.

Arms 51 constitute the power arms of the bell crank levers which are pivoted as at 49 within sockets formed by centrally offset straps 50 attached to the upstanding legs of the bars 24. In the herein described embodiment four drag bars are used, three being placed between the front and rear wheels and one positioned rearwardly of the rear wheels. The three drag bars between the wheels are mutually linked by a connecting rod 52 above each side bar 24, rod 52 being pin connected to the lever arms 51. The trailing drag bar is independent of the others and is resiliently held in operative position by springs 53 connected to the lever arms 51 of the arms 48 and to suitable clip angle legs 54 upstanding the side bars 24.

The front wheels are castor wheels mounted in rotatable yokes 55 positioned at the outward sides of bars 24, each being supported by one of the transverse, horizontally disposed, rods 56 journaled upon the front frame member 25 with each front wheel being adapted to respond independently of the other, to altitudinal variations in the ground surface through rotation of its rod 56 in its journal. Affixed to each rod 56 is a lever arm 57 between the yoke 55 and the side bar 24, which arm 57 is operatively linked to one arm of a bell crank lever 58 by a toggle 59. The bell crank 58 is pivotally connected to the side bar 24 and the upper arm is pivotally connected to the end of connecting rod 52. Through the linkage comprising the rod 56, the lever arm 57, the toggle 59, the bell crank 58, the connecting rod 52 and the lever arms 51, each front wheel 19 is operatively connected with the arms 48 between it and the rear wheels on its side of the apparatus, and through this linkage an altitudinal movement of a front wheel 19, with respect to the frame, results in an opposite altitudinal movement of ends of the drag bars on that side of the apparatus.

In the operation of this apparatus it is anticipated that the frame will be held in a plane parallel with the surface of the earth, normally a horizontal plane, but that as the apparatus passes over uneven ground, each front wheel will lower or rise as it passes over uneven earth surface. Following the front wheels, the drag bars level the ground surface and the rear wheels will therefore hold substantially to a horizontal plane and the frame of the apparatus will rotate evenly about these rear wheels when the front wheels rise or drop simultaneously, or warp or twist relative to the apparatus longitudinal axis when either front wheel rises or drops relative to the other. The movements of a front wheel 19 are not accompanied by a complete corresponding lowering or rising of the side bars because there will be a definite movement of the linkage connecting the front wheel and drag bars whereby a movement, such as a drop of the front wheel will cause a lift of the drag bars on that side of the apparatus, thereby holding the drag bars substantially at their initial elevation.

When a front wheel drops, the ends of the drag bars at that side are swung rearwardly thereby giving them a diagonal position relative to the apparatus longitudinal axis resulting from the movement of the arms 48 with the result that earth being moved by the drag bars is shifted transversely toward the lowered spot wherein the wheel has dropped. Likewise, when a wheel is raised, that side of the drag bars shifts forwardly to move the earth in the other direction.

The drag bars are preferably of equal length and extend symmetrically beyond the frame members to any desirable distance. In the course of leveling operations there will, therefore, be a sideward movement of some of the earth dragged by the drag bars which will tend to cause a small ridge beyond the ends of the dragbars. To break this ridge and further level it to a point of insignificance, a hooked arm 60 is connected at each end of the rear drag bar which extends outwardly beyond the ends of the bar. In preferred construction, these arms are pivotally mounted between the angle legs of the rear drag bar as by a pin 61, and are further held in outward position by latches 62, engageable in suitable orifices in the legs of the angle forming the drag bar, or may be folded back into the drag bar by release of the latch.

The weight of the drag bars is not a paramount feature of this leveling apparatus, for they are held substantially in a given altitudinal position regardless of the earth's contours and will not be deviated by a small ridge which may be transverse of the leveling apparatus movement. Further, the drag bars being relatively narrow sections will tend to exert considerable force to cut through a small hillock or uneven rise of earth.

As a further modification, whereby to attain a precise control of the drag bars, the lever arms 51 may be varied in length with the longest arm above the drag bar just forward of the rear wheels with the arms 51 shortening progressively forwardly whereby to attain a compensating altitudinal movement of the drag bars as the side bars are rotated about the rear wheels. With such arrangement the drag bar adjacent the front of the rear wheel will adjust a minimum amount and the forward drag bar adjacent the front wheel will adjust a maximum amount which may be so varied that whenever a front wheel drops into a hole or rises over a ridge, all of the drag bars retain precisely the same elevation as the side bar rotates about the rear wheels.

Not only is there control of the drag bars through the linkage interconnecting them to the front wheels 19, but there is also a definite pressure control, that is control of pressure of the drag bars against the ground, and through adjustments of the lift bars 22 of the tractor and the positioning of the rear wheels 18, as, for example, where the apparatus is being moved over soft earth, of such a character that the drag bars 16 would cut into the earth if the pressure upon them were the full weight of the apparatus, it becomes desirable to shift the weight of the frame from the drag bars to the rear wheels and to the tractor itself. This is accomplished by raising the lift bars of the tractor to such position, intermediate the extremes of position shown at Figs. 1 and 2, that the rear wheels will be lowered slightly so as to support an increased portion of the weight of the frame, while the lifting of the tongue by the lift bars will tend to raise the front of the frame, thus relieving the drag bars and front wheels of a substantial portion of the weight of the frame. Such cooperation between the linkage connecting the tongue 20 and the rear wheels 18 and the linkages connecting the drag bars and front wheels effectuates land leveling operations at any desired pressure of the drag bars against the earth.

While I have illustrated and herein described many details of construction, alternatives and equivalents will be obvious to those skilled in the art, and I desire my protection to be limited not by the details illustrated and/or described but only by the spirit and scope of the appended claim.

I claim:

In an earth leveling machine comprising a frame mounted upon rear wheels, a tongue pivotally connected to the front end of the machine and adapted to be connected with the lift bars of a tractor for lifting said front end, a transverse shaft connected with the rear of the frame and having yokes extended outwardly of the shaft carrying the rear wheels, whereby rotation of said shaft is adapted to altitudinally move the frame with respect to said rear wheels, a lever upstanding from said tongue, a lever upstanding from said shaft, a linkage associated with said levers through which the lifting and rotation of the tongue reacts to rotate said rear shaft to depress the rear wheels and thereby lift the rear portion of the frame, and a stop associated with the tongue to limit its rotation relative to the front end of the frame and to thereby cause the front of the frame to be lifted responsive to the further rotation of the tongue.

References Cited in the file of this patent

UNITED STATES PATENTS

| Number | Name | Date |
|---|---|---|
| 721,610 | Scott | Feb. 24, 1903 |
| 823,544 | Parker | June 19, 1906 |
| 1,845,324 | Noffsinger et al. | Feb. 16, 1932 |
| 2,025,257 | Vaughn et al. | Dec. 24, 1935 |
| 2,059,205 | Buffington | Nov. 3, 1936 |
| 2,283,744 | Lethlean | May 19, 1942 |
| 2,386,378 | Wippel | Oct. 9, 1945 |
| 2,444,086 | Baker, Jr. | June 29, 1948 |
| 2,595,289 | Peterson | May 6, 1952 |
| 2,598,151 | Warshaw | May 27, 1952 |